Figure 1:
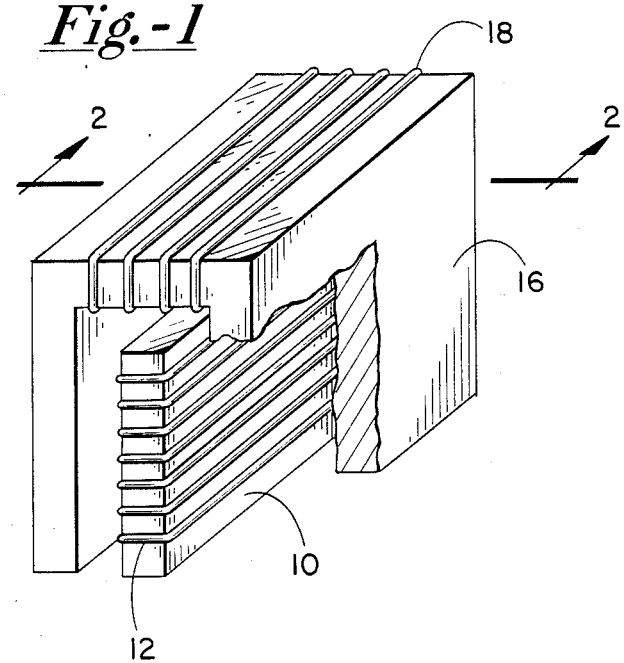

United States Patent [19]
Perlov

[11] Patent Number: 4,748,525
[45] Date of Patent: May 31, 1988

[54] PROBE HEAD FOR VERTICAL RECORDING

[75] Inventor: Craig M. Perlov, Los Altos, Calif.

[73] Assignee: Magnetic Peripherals Inc., Minneapolis, Minn.

[21] Appl. No.: 96,082

[22] Filed: Sep. 14, 1987

Related U.S. Application Data

[63] Continuation of Ser. No. 829,598, Feb. 14, 1986, abandoned.

[51] Int. Cl.$^4$ .......................... G11B 5/127; G11B 5/17
[52] U.S. Cl. .................................. 360/110; 360/123; 360/125
[58] Field of Search ............... 360/110, 113, 121, 122, 360/123, 125; 346/74.5

[56] References Cited

U.S. PATENT DOCUMENTS

| | | | |
|---|---|---|---|
| 3,120,001 | 1/1964 | Supernowicz | 360/125 |
| 4,130,242 | 12/1978 | Mannion | 360/123 X |
| 4,317,148 | 2/1982 | Chi | 360/119 |
| 4,385,334 | 5/1983 | Yanagida | 360/125 |
| 4,575,777 | 3/1986 | Hosokawa | 360/123 |
| 4,649,449 | 3/1987 | Sawada et al. | 360/123 |
| 4,656,546 | 4/1987 | Mallory | 360/110 |
| 4,672,494 | 6/1987 | Furuya et al. | 360/125 |

FOREIGN PATENT DOCUMENTS

| | | | |
|---|---|---|---|
| 54-34219 | 3/1979 | Japan | 360/113 |
| 55-87325 | 7/1980 | Japan | 360/123 |
| 57-210414 | 12/1982 | Japan | 360/125 |
| 1114002 | 5/1968 | United Kingdom | 360/125 |

OTHER PUBLICATIONS

Hoagland, "Combined Longitudinal and Vertical Recording Head," IBM Tech. Disc. Bull., vol. 20, No. 8, Jan. 1978.

Primary Examiner—Stuart N. Hecker
Assistant Examiner—Benjamin E. Urcia
Attorney, Agent, or Firm—J. A. Genovese; R. M. Angus

[57] ABSTRACT

A probe head for vertical recording includes a U-shaped member partially surrounding the probe and a coil supported by the U-shaped member. When the coil is energized, flux from the probe is focused to the region between the legs of the U-shaped member to greatly increase flux gradient during a write operation.

1 Claim, 1 Drawing Sheet

PROBE HEAD FOR VERTICAL RECORDING

This application is a continuation of application Ser. No. 829,598, filed Feb. 14, 1986 now abandoned.

This invention relates to magnetic recording and particularly to magnetic recording read and write heads. The invention is particularly concerned with heads useful for perpendicular or vertical recording.

Perpendicular or vertical recording is characterized in that the orientation of magnetic dipoles in the record media is perpendicular or orthogonal to the plane of the recording media. To accomplish vertical recording, a magnetic head in the form of a "probe" provides a strong magnetic field which, when the probe head is positioned adjacent the recording surface of the media, provides a strong magnetic field through the media. Current in the probe coil associated with the probe can be reversed, thereby reversing the magnetic field and orienting the magnetic dipoles in the desired direction. It is important in probe heads for perpendicular recording that the magnetic field gradient be particularly high.

It is an object of the present invention to provide a simple probe head for magnetic perpendicular recording which focuses the magnetic field from the probe to provide high field gradients and a small head field area.

Another object of the present invention is to provide a magnetic probe head for vertical recording which is highly efficient during read operations.

In accordance with the present invention, a magnetic probe head for vertical recording includes a probe with a probe coil for producing the magnetic field for write purposes and sense field for read purposes. A U-shaped member surrounds a portion of the probe and provides an easy return path from magnetic flux during read operations. The U-shaped member carries a coil which serves to focus the magnetic field from the probe during write operation.

Figure 2:
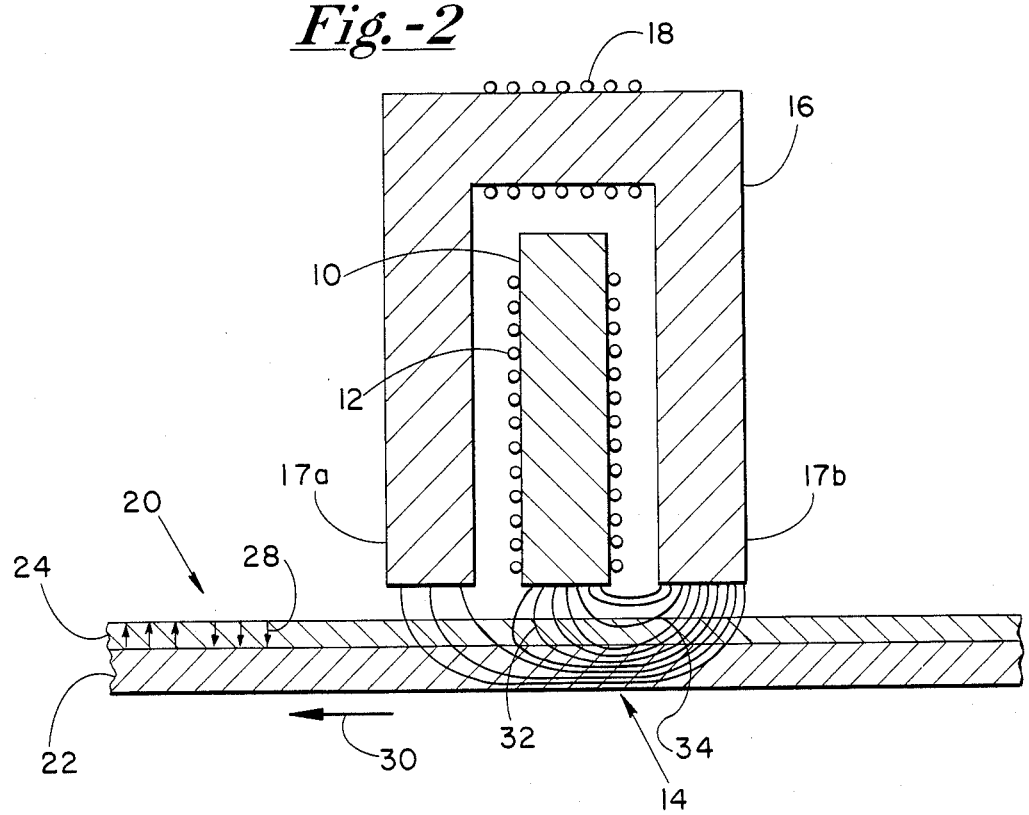

The above and other features of this invention will be more fully understood from the following detailed description and the accompanying drawings, in which:

FIG. 1 is a perspective view, partly in cutaway cross-section of a magnetic probe head for vertical recording in accordance with the presently preferred embodiment of the present invention; and FIG. 2 is a section view at plane 2—2 in FIG. 1.

Referring to the drawings, there is illustrated a magnetic probe head for vertical recording in accordance with the presently preferred embodiment of the present invention. The probe head includes a probe 10 constructed of a suitable metal ferromagnetic material and includes a read/write probe coil 12. Coil 12, when energized, produces a magnetic field as shown by the gradients 14 in FIG. 2. Partially surrounding the probe 10, and spaced therefrom, is a U-shaped member 16 constructed of suitable metal ferromagnetic material. Coil 18 is wrapped around the uppermost leg of U-shaped member 16.

The probe head illustrated in FIGS. 1 and 2 is used by placing it adjacent a magnetic media 20 consisting of a substrate 22 and a magnetic layer 24 so that the lower ends 17a and 17b of the U-shaped member and the lower end of the probe and 17b of the U-shaped are proximate to the magnetic media. Substrate 22 may be any suitable support material, preferably of magnetic conductive material Magnetic layer 24 is the magnetic media in which the magnetic dipoles are oriented. During the write operation, coil 12 is energized with write signals in a manner well known in the art to generate a magnetic field whose flux is diagrammatically illustrated at 14. Coil 18 is also energized to sharply focus the flux lines 14 in the region of the media adjacent probe 10 and between the legs of U-shaped member 16 to orient dipoles vertically as illustrated generally at 28 in a narrow region. It should be noted, from an inspection of FIG. 2, that flux lines from probe 10 which would ordinarily be positioned to the left (toward end 17a of member 16) are diverted toward the right end 17b, thereby focusing the write signal. Hence, end 17b of member 16 forms an easy magnetic circuit with probe 10 during recording.

It is evident to one of ordinary skill in the art that in order to produce a "sharp" record pattern at the lead edge of a recorded bit as the media 20 is moving in the direction of arrow 30, it is important that currents in focus coil 18 and probe coil 12 are simultaneously "switched" in accordance with the bit code being recorded. Thus, if the direction of current is to be reversed in the probe coil 18 to reverse the direction of the magnetic field, the current in the focus coil also should simultaneously be reversed so that the end 17a of the focus member is always of the same magnetic polarity as the tip of the probe 10, and the end 17b of the focus member is always of the opposite polarity as the tip of probe 10. Hence, the magnetic gradient produces sharp, vertical flux lines at 32 to form the leading edge of the recorded pulse, as opposed to the more lateral flux lines illustrated at 34 at the trailing edge of the probe. From the foregoing, it is evident that the current in coils 12 and 16 need only be capable of creating the foregoing pole arrangement and strong enough to assure proper recording Typically, the magnetic field created by the current in coil 12 should be strong enough to perform the recording and the magnetic field created by current in coil 18 should not be so strong as to deteriorate the recording and need only be adequate to maintain the magnetic polarity.

During a read operation, coil 18 is not energized; the magnetic orientation within the media induces a flux within probe 10 to alter the signal in coil 12, thereby generating a read signal. The magnetic path provided by U-shaped member 16 provides an easy return path for the flux within the magnetic media 20, thereby increasing the efficiency of the head during the read operation without sacrificing resolution.

The head is efficient in operation and provides a highly effective read and write transducer for vertical recording.

This invention is not to be limited by the embodiment shown in the drawings and described in the description, which is given by way of example and not of limitation, but only in accordance with the scope of the appended claim.

What is claimed is:

1. A magnetic recording head for vertically recording digital information onto a moving magnetic medium comprising a probe comprising a ferromagnetic metal bar having a lower end; a read/write coil means wrapped around said probe for inducing magnetic flux in said probe to establish a magnetic pole in the lower end of said probe; a substantially U-shaped member having a pair of legs and an upper body portion constructed of metal at least partially surrounding and spaced from said probe, said legs each having a lower end distal said upper body portion, the lower ends of said legs and the lower end of said probe being so disposed and arranged proximate to said moving magnetic medium that the lower end of one of said legs is leading the lower end of said probe and the lower end of the other of said legs is trailing the lower end of said probe in relation to the relative movement of said probe with respect to said medium and at least one of said legs provides an easy magnetic circuit for magnetic flux induced in said probe by said read/write coil means; and a focus coil means wrapped around said upper body portion of said U-shaped member for focusing the magnetic flux induced in said probe by said read/write coil means to a region of the magnetic medium between the lower ends of the legs of said U-shaped member by establishing a magnetic pole in the lowe end of the leg leading said probe which is the same polarity as the magnetic pole established in said probe, said focus coil means establishing a magnetic pole in the lower end of the leg trailing said probe which is the opposite polarity as the magnetic pole established in said probe to thereby provide a magnetic flux return path from the magnetic medium to said probe during recording.

* * * * *